United States Patent [19]

das Dores

[11] Patent Number: 5,317,775

[45] Date of Patent: Jun. 7, 1994

[54] HOLD-DOWN MECHANISM FOR A LOADING PLATFORM

[75] Inventor: Antonio P. das Dores, HL Leystad, Netherlands

[73] Assignee: Van Wiik Nederland B. V., PJ Lelvstad, Netherlands

[21] Appl. No.: 965,865

[22] Filed: Oct. 23, 1992

[30] Foreign Application Priority Data

Oct. 23, 1991 [DE] Fed. Rep. of Germany ... 9113153[U]

[51] Int. Cl.$^5$ .......................... E01D 1/00; B65G 69/28
[52] U.S. Cl. ........................................ 14/71.3; 14/69.5
[58] Field of Search .................... 14/69.5, 71.3, 71.7

[56] References Cited

U.S. PATENT DOCUMENTS 3,646,627 3/1972 Potter ..................................... 14/71.3
4,974,276 12/1990 Alexander ............................ 14/71.7

FOREIGN PATENT DOCUMENTS 428805 5/1991 European Pat. Off. .

Primary Examiner—Ramon S. Britts
Assistant Examiner—James A. Lisehora

[57] ABSTRACT

The invention relates to a hold-down mechanism for loading platforms of loading ramps with a platform on their end towards the ramp, which is pivotable around a horizontal shaft, and having an extension which can be flipped out, and features a square pipe with a lug fastened on a support and with support plates disposed on both sides and parallel to each other, which have a support or roller with an inclination of less than 50°, in the gap of which, limited by the inclination, a wedge with a braking plate is disposed, also having a rod, movably disposed parallel to the pipe, which is fastened on the support by means of a lug, and having two flat iron pieces at the upper and lower edges of the support plates as well as of the wedge disposed therebetween, between which two tension springs are stretched for moving the wedge with the braking plate into the opening between the support and the rod, and an unlatching mechanism.

8 Claims, 3 Drawing Sheets ical. The flat iron piece 10 is preferably welded on the support plates 8, while the flat iron piece 13 is preferably welded on the wedge 11.

HOLD-DOWN MECHANISM FOR A LOADING PLATFORM

FIELD OF THE INVENTION

The invention relates to a hold-down mechanism for a loading platform.

BACKGROUND OF THE INVENTION

The following situation regarding the loading and unloading process prevails in connection with loading platforms:

The platform, which is pivotable around a horizontal axis at its ramp end, is moved into its highest position by appropriate spring-assisted drives. There, the extension is flipped out by means of appropriate devices and an operator moves onto the platform. Because of the additional weight, the platform is lowered onto the load bed of the vehicle to be loaded or unloaded. A hold-down mechanism is used, so that the platform always follows the vertical movements, up as well as down, of the vehicle generated by the in and out movements of the loading equipment.

Existing systems operate with a toothed rack which can be latched. Downward movement takes place without resistance. If the load bed of the vehicle is raised, a built-in spring allows the platform to be slightly raised. If the platform is raised too far, an unlatching chain undoes the latch and the toothed rack is lifted out of the lock one tooth at a time. The disadvantage of the toothed rack system lies in the loud noise generated, as well as the non-continuous and, because of the teeth, jerky movement, when the platform is lifted. The manufacture of these systems is also relatively expensive.

Such a mechanism, operating on the basis of oil and gas pressure, is known from European Patent Disclosure EP-A 0 428 805. However, this, too, is comparatively expensive to manufacture.

SUMMARY OF THE INVENTION

It is therefore the object of the invention to develop a hold-down mechanism which operates continuously, the noise level of which is low and which can be simply and cost-efficiently produced.

This object is attained in accordance with the invention by replacing the toothed rack with its latch by a system operating by means of frictional engagement.

The invention will be explained by means of the attached drawings.

DETAILED DESCRIPTION

Figure 1:
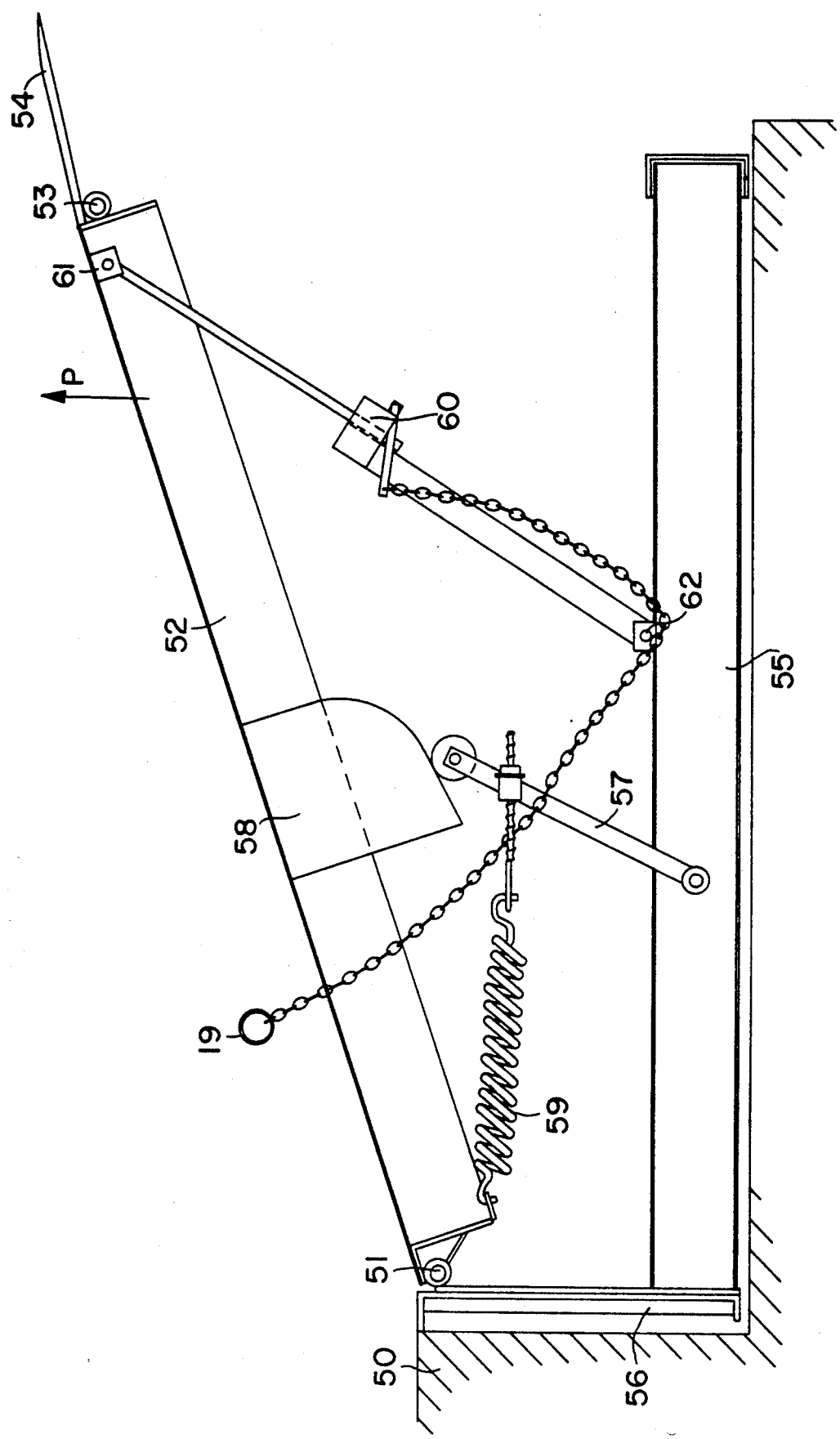
FIG. 1 is a schematic longitudinal section through a loading platform for the purpose of explaining the total situation.

The lower platform frame 55, integrated into the ramp 50 and with a rear frame 56 is shown in FIG. 1. The platform 52 with the extension 54, rotatable around the shaft 53, is rotatably seated in the rear frame 56. A drive mechanism which may consist, for example, of a lift arm 57, a cam 58 and a tension spring 59, always provides an upward force P in the platform 52. A hold-down mechanism 60 is fixed between the support 62 of the lower frame 55 and the support 61 of the platform 52 to assure adequate operation of the platform. This mechanism is intended to permit free downward movement of the platform 52, but to oppose the upward force P provided by the drive, so that automatic lifting of the platform 52 can be prevented. It is furthermore intended that the hold-down mechanism 60 can be unlatched by means of an appropriate device, for example a pull chain 19. This makes it possible to bring the platform out of its position of rest into the operating position. The upward force P approximately corresponds to the operator's own weight. By stepping on the platform 52, the operator lowers it into the loading or resting position (the latter with the extension 54 flipped back).

In addition, the hold-down mechanism is intended to assure the continuous movement of the loading platform along with the load bed of the vehicle. If the load bed to be loaded or unloaded is raised during the loading operation while the extension rests on it, the upward force P increases. Thus, to follow the load bed in its upward movement, the hold-down mechanism must yield to the increased upward force P. Only in this way can the so-called "floating position" of the loading platform, i.e. the continuous coincidence of the movements of the loading platform and the load bed, be attained.

The mechanism of the invention complies with all criteria mentioned, as explained below.

Figure 2:
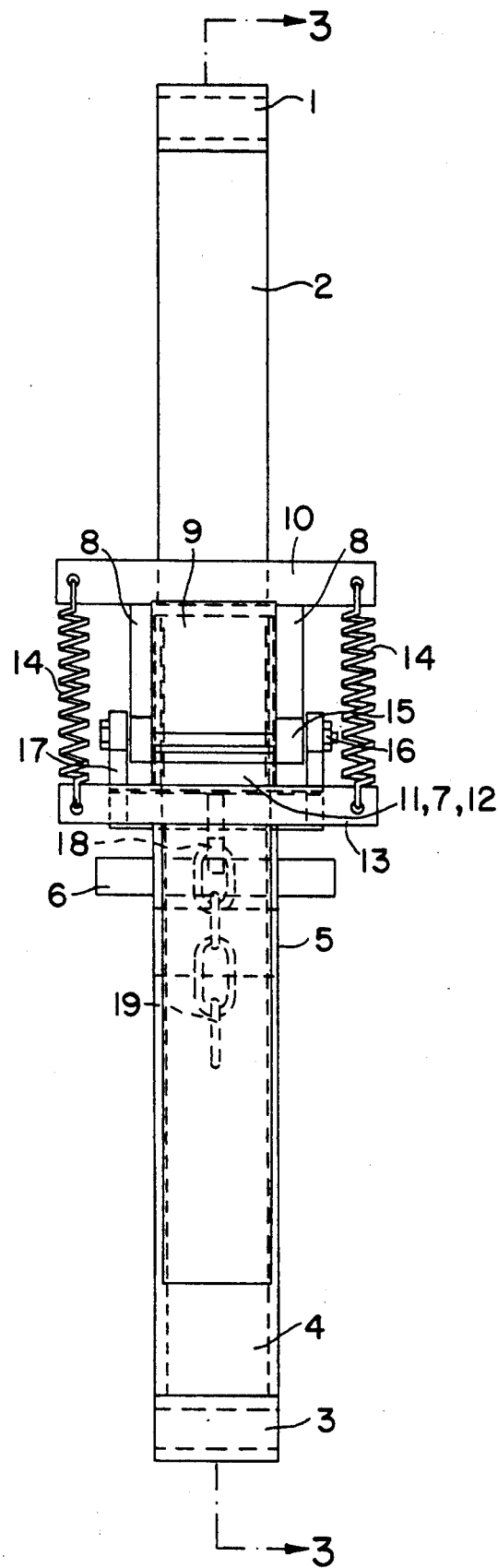
FIG. 2 is a front view of the hold-down mechanism in accordance with the invention.
Figure 3:
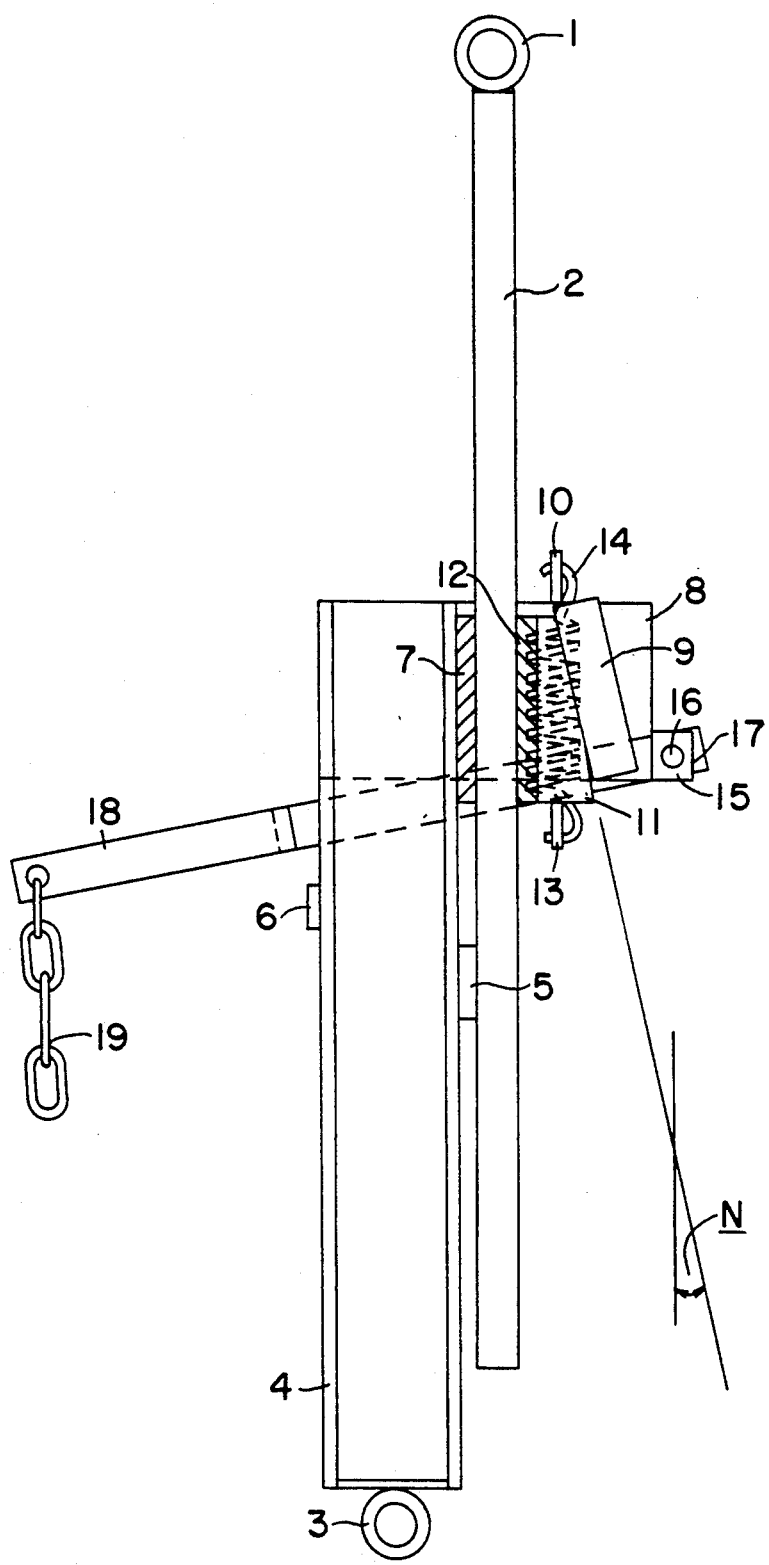
FIG. 3 is a section through the mechanism along the line A—A in accordance with FIG. 2.

The hold-down mechanism shown in FIGS. 2 and 3 essentially comprises a square pipe 4 with a fastening, preferably a lug 3, on the support 62 of the loading platform. It also comprises a sliding plate 5, disposed above its center, as well as a braking plate 7, disposed on the same side at the upper end. A movable rod 2, preferably a flat iron piece, is disposed along the sliding plate 5 and the braking plate 7 parallel to the pipe 4 and is fastened on the support 61 of the loading platform by means of a suitable device, for example a lug 1. Two support plates 8 are disposed parallel to each other on both sides of the pipe 4 at the height of the braking plate 7 and have a support 9, which may be friction rollers, with an inclination N of less than 90°, particularly less than 45°. A trapezoidal wedge 11 with a braking plate 12 contained therein is located in the trapezoidal opening formed by the inclination N between the support 9 and the rod 2 between the plates 8. This wedge 11 with the attached braking plate 12 is sized to correspond to the opening or inclination N and can perform a translational movement in the direction of the rod 2. The support plates 8 as well as the wedge 11 have on their upper or lower edges a flat iron piece 10 or 13. Two tension springs 14 are stretched between these flat iron pieces 10 and 13 and push the wedge 11 with the braking plate 12 into the trapezoidal opening between the support 9 and the rod 2.

The rod 2 is clamped in this way by the braking plates 7 and 12, so that the lugs 1 and 3 cannot move away from each other, because the friction between the braking plates 7 and 12 and the rod 2 prevents this. In this way the force P, generated by the drive mechanism, can be contained by the hold-down mechanism of the invention. The frictional coefficients of the braking plates 7 and 12 and of the rod 2, on the one hand, and the amount of the inclination N, on the other, are crucial for this. Accordingly, motor vehicle disk brake blocks of a known type or a square pipe of steel, as well as an inclination N of 40° to 85°, preferably 60° to 75°, are preferably selected. An inclination of from 1° to 50°, more preferably from 3° to 10°, is particularly preferred.

The wedge itself is preferably made of steel and has a trapezoidal shape corresponding to the dimension of the said gap. The said supports are of a conventional type.

Now, if the vehicle bed with the extension 54 resting thereon is raised, the upward force P is considerably increased. This results in the frictional engagement being overcome and the lug 3 being moved away from the lug 1 until the force P is sufficiently lowered so that frictional engagement is again generated This permits an exact movement millimeter by millimeter of the platform 52 along with the load bed of the vehicle when the latter is being raised.

If the load bed with the platform 52 is lowered because of a load, the lugs 1 and 3 come closer to each other. This can take place without resistance, because the wedge 11 with the braking plate 12 is then pushed out of the trapezoidal opening between the support 9 and the rod 2, i.e. there is no frictional engagement.

Thus the mechanism of the invention fulfills the demand for continuous coincidence of the movement of the loading platform and the load bed. Because of the construction from simple devices, jerky compensation movements are avoided, the same as movement noises caused by discontinuous compensation.

The hold-down mechanism in accordance with the invention furthermore has an unlatching device for bringing the platform 52 from a low position, for example the position of rest, into a higher operating position.

Preferably this unlatching device comprises an unlatching lever 18, which is fastened via a fork 17 by means of bolts 16 on the eyes 15 of the support plates 8 approximately perpendicular to the pipe 4 or rod 2 above the flat iron piece 13, and which has a chain 19 on its free end. This chain 19 is connected to the loading platform. If a pull is exerted on the chain 19, the arms of the fork 17 push the flat iron piece 13 down. The result of this is that the flat iron piece 13 moves the wedge 11 with the braking plate 12 out of the trapezoidal opening between the support 9 and the rod 2. In this way the frictional engagement is lost and the drive mechanism (in this case 57, 58, 59) moves the platform 52 upwards. In the course of this the springs 14 are tensed. If the chain 19 is loosened, the springs 14 pull the wedge 11 with the braking plate 12 back into the trapezoidal opening between the support 9 and the rod 2. Frictional engagement is again provided and all movements can be made as described.

In a further embodiment, a sliding plate 12 is used in place of the brake block 12 (braking plate).

In addition, it is preferred to replace the support 9 by rollers which decrease friction between the wedge 11 and the support 9.

A further embodiment is preferred, where the brake block 7 and the sliding plate 5 are not used.

In another preferred embodiment, the lug 3 is connected with the pipe 4 by means of a spring mechanism which permits a translational movement in the direction of the pipe 4 under tension.

In this way the mechanism of the invention meets all criteria listed at the beginning. It is of simple construction, can be manufactured of readily available materials and operates automatically and independently of additional control mechanisms, such as are required in the case of devices operating with oil-gas pressure controls.

What is claimed is:

1. A hold-down mechanism for a loading platform (52) of a loading ramp (50) which loading ramp has a side having an upper end and a lower end, wherein the hold-down mechanism comprises: 1) a rear frame (56), which rear frame is attached to the side of the loading ramp and lies parallel to the side of the loading ramp, which rear frame has an upper end and a lower end corresponding to the upper end and lower end of the loading ramp, which rear frame has a horizontal shaft (51) attached to the upper end thereof; 2) a lower frame (55) attached to the lower end of the rear frame and running normal to the side of the loading ramp; 3) a loading platform (52), having a proximal end, a distal end, an upper end and a lower end, wherein the upper end of the proximal end is attached to the horizontal shaft (51) and pivotable on the horizontal shaft, wherein the upper end of the distal end is attached to a horizontal shaft (53), wherein an extension (54) is attached to the horizontal shaft (53) and is pivotal on the horizontal shaft; 4) a drive mechanism which generates an upward force (P) for raising the loading platform (52); and 5) a hold-down mechanism (60) having a lower end and an upper end, which lower end of the hold-down mechanism is attached to a first support (62) on the lower frame (55) and which upper end of the hold-down mechanism is attached to a second support (61) on the loading platform (52); wherein the hold-down mechanism comprises:

a square pipe (4) having a lower end, an upper end, an upper surface, two lateral sides, and a center, which center is located equidistant from the lower end and the upper end, which square pipe is fastened to the first support (62) by a first lug (3), a sliding plate (5) disposed above the center of the square pipe (4), a first braking plate (7) disposed at the upper end of the square pipe (4), two support plates (8), one support plate disposed on each lateral side of the square pipe and the two support plates being parallel to each other and are situated on the square pipe at the location of the braking plate (7), a third support (9) connecting the two support plates (8), which third support (9) has an inclination (N) of less than 50°, which third support (9) thus creates a wedge-shaped gap between the upper surface of the square pipe and the third support (9), a wedge (11) and a second braking plate (12) disposed within the wedge-shaped gap, a rod (2), movably disposed parallel to the square pipe (4) between the first braking plate (7) and the second braking plate (12), which rod has an upper end and a lower end, the upper end being fastened to the second support (61) by means of a second lug (1), which rod (2) limits the space created by the first braking plate (7) and the inclination (N) of the third support (9) in which the wedge (11) and the second braking plate (12) are disposed, a first flat iron piece (10) fixed against the two support plates (8) and a second flat iron piece (13) fixed against the wedge (11), two tension springs (14) attached to the first flat iron piece (10) and the second flat iron piece (13), which tension springs move the wedge (11) and the second braking plate (12) away from the first lug (3) into the space between the third support (9) and the rod (2), and an unlatching mechanism.

2. The hold-down mechanism of claim 1, wherein the unlatching mechanism comprises an unlatching lever (18) which has a free end, which lever is fastened via a fork (17) by means of bolts (16) on a plurality of eyes (15) of the two support plates (8) approximately perpendicular to the square pipe (4) and rod (2) above the second flat iron piece (13), and which has a chain (19) having two ends, one end of which is connected to the free end of the lever and the other end of which is attached to the loading platform.

3. The hold-down mechanism of claim 1, wherein the first lug (3) is connected to the square pipe (4) via a spring mechanism.

4. The hold-down mechanism of claim 1, wherein the inclination (N) of the third support (9) is 1° to 50°.

5. The hold-down mechanism of claim 1, wherein the first braking plate (7) or the second braking plate (12) is a motor vehicle disc brake block.

6. The hold-down mechanism of claim 1, wherein the second braking plate (12) is a sliding plate.

7. A hold-down mechanism for a loading platform (52) of a loading ramp (50) which loading ramp has a side having an upper end and a lower end, wherein the hold-down mechanism comprises: 1) a rear frame (56), which rear frame is attache dot the side of the loading ramp and lies parallel to the side of the loading ramp, which rear frame has an upper end and a lower end corresponding to the upper end and lower end of the loading ramp, which rear frame has a horizontal shaft (51) attached to the upper end thereof; 2) a lower frame (55) attached to the lower end of the rear frame and running normal to the side of the loading ramp; 3) a loading platform (52), having a proximal end, a distal end, an upper end and a lower end, wherein the upper end of the proximal end is attached to the horizontal shaft (51) and pivotable on the horizontal shaft, wherein the upper end of the distal end is attached to a horizontal shaft (53), wherein an extension (54) is attached to the horizontal shaft (53 and is pivotal on the horizontal shaft; 4) a drive mechanism which generates an upward force (P) for raising the loading platform (52); and 5) a hold-down mechanism (60) having a lower end and an upper end, which lower end of the old-down mechanism is attached to a first support (62) on the lower frame (55) and which upper end of the hold-down mechanism is attached to a second support (61) on the loading platform (52); wherein the hold-down mechanism comprises:

a square pipe (4) having a lower end, an upper end, an upper surface, two lateral sides, and a center, which center is located equidistant from the lower end and the upper end, which square pipe is fastened to the first support (62) by a first lug (3), a first braking plate (7) disposed at the upper end of the square pipe (4), two support plates (8), one support plate disposed on each lateral side of the square pipe and the two support plates being parallel to each other and are situated on the square pipe at the location of the braking plate (7), a third support (9) connecting the two support plates (8), which third support (9) has an inclination (N) of less than 50°, which third support (9) thus creates a wedge-shaped gap between the upper surface of the square pipe and the third support (9), a wedge (11) and a second braking plate (12) disposed within the wedge-shaped gap, a rod (2), movably disposed parallel to the square pipe (4) between the first braking plate (7) and the second braking plate (12), which rod has an upper end and a lower end, the upper end being fastened to the second support (61) by means of a second lug (1), which rod (2) limits the space created by the first braking plate (7) and the inclination (N) of the third support (9) in which the wedge (11) and the second braking plate (12) are disposed, a first flat iron piece (10) fixed against the two support plates (8), and a second flat iron piece (13) fixed against the wedge (11), two tension springs (14) attached to the first flat iron piece (10) and the second flat iron piece (13), which tension springs move the wedge (11) and the second braking plate (12) away from the first lug (3) into the space between the third support (9) and the rod (2), and an unlatching mechanism.

8. The hold-down mechanism of claim 1, wherein the third support (9) comprises friction rollers.

* * * * *

UNITED STATES PATENT AND TRADEMARK OFFICE
CERTIFICATE OF CORRECTION

PATENT NO.: 5,317,775

DATED: June 7, 1994

INVENTOR(S): das DORES

It is certified that error appears in the above-identified patent and that said Letters Patent is hereby corrected as shown below:

Claim 7, column 5, line 39, "(53" should be --(53)--.

Signed and Sealed this

Twenty-seventh Day of September, 1994

Attest:

BRUCE LEHMAN

Attesting Officer

Commissioner of Patents and Trademarks